United States Patent Office
3,079,356
Patented Feb. 26, 1963

3,079,356
NEW PIGMENT RESIN PRINTING PASTE AND A METHOD OF PRODUCING THE SAME
Ryohei Oda, Kyoto, Shigeru Tajima, Ashiya-shi, and Ikuo Muraoka and Kinji Matsumoto, Amagasaki-shi, Japan, assignors to Sumitomo Chemical Company, Ltd., Higashi-ku, Osaka, Japan, a corporation of Japan
No Drawing. Filed Apr. 2, 1958, Ser. No. 725,797
Claims priority, application Japan Apr. 5, 1957
10 Claims. (Cl. 260—29.6)

This invention relates to a new pigment resin printing paste and a method of producing the same. More particularly this invention relates to a printing paste for obtaining fast, deep, clear and beautiful printed fabrics and a method of producing the same.

The water-in-oil emulsion printing pastes heretofore used for pigment printing on fabrics are deficient in that they damage rubber printing rolls and make it very difficult to wash engraved rolls with water. Oil-in-water emulsion printing pastes or aqueous printing pastes using no oil have recently been used as printing pastes. The binder resins used for such oil-in-water emulsion printing pastes or aqueous printing pastes must be water-soluble or easily dispersible in water as distinguished from the conventional oil-soluble resins. Various synthetic resins having such characteristics have recently been investigated. However, most of such binder resins must be cured by after-treatment at a high temperature such as about 150° C. Some of the thusly formed films may not be fast enough and, in fact, no satisfactory printing pastes have as yet been obtained.

An object of the present invention is to provide a new pigment resin printing paste for obtaining fast, deep, clear and beautiful printed fabrics prepared by using a binder resin which is water-soluble, needs no high curing temperature, can be cured by intermediate drying merely on a cylinder after printing, and is superior in fastness to any conventional binder resin. A further object is to provide a method of producing the same.

More particularly, the present invention relates to a process for preparing a printing paste wherein polyvinyl alcohol or allyl alcohol-modified polyvinyl alcohol is acetalized with the addition of 0.1 to 0.5 mol of an unsaturated aldehyde per mol thereof and the thusly acetalized polymer is used as a binder agent to which is added a coloring material.

The present invention further relates to a printing paste prepared by a process wherein polyvinyl alcohol or allyl alcohol-modified polyvinyl alcohol is acetalized with the addition of 0.1 to 0.5 mol of an unsaturated aldehyde per mol thereof and the further addition of one or more saturated aldehydes and is used as a binder agent in which a coloring material is mixed, so that the printing paste may have a proper viscosity and may be favorable for use in doctor streaks in case it is used as an aqueous printing paste using no oil.

Also, according to the present invention, in connection with setting a pigment on fabrics in an alkaline bath or specifically in the case of using the printing paste together with a naphthol dyestuff, the product obtained by acetalizing polyvinyl alcohol or allyl alcohol-modified polyvinyl alcohol with the addition of 0.1 to 0.5 mol of an unsaturated aldehyde per mol thereof may be a binder agent. Further, polyvinyl alcohol or allyl alcohol-modified polyvinyl alcohol acetalized with the addition of 0.1 to 0.5 mol of an unsaturated aldehyde and a saturated aldehyde per mol thereof may be a binder agent. To such basic paste is added an aqueous solution of the acid salt of a polymeric acid amide made from polyacrylic acid ester and diamine or polyamine. A coloring material is further mixed therein.

The printing paste according to the present invention may also include a thermoplastic resin latex and/or another thermosetting resin paste in addition to the acetalized polyvinyl aclohol which is the binder resin so that the pigment may be better set and so that the film formed may be better.

The binder resin in the present invention is a partially acetalized resin prepared by adding an unsaturated aldehyde to an aqueous solution of polyvinyl alcohol or allyl alcohol-modified polyvinyl alcohol in the presence of mineral acid as a catalyst. The allyl alcohol-modified polyvinyl alcohol so-called in the present invention is a water-soluble polymer obtained by co-polymerizing vinyl acetate and allyl acetate and then alkali-hydrolyzing the co-polymer.

The unsaturated aldehyde used in the present invention is acrolein, meta-acrolein or croton-aldehyde. The amount of the unsaturated aldehyde used in the reaction is not different according to the aldehyde but is substantially the same and is 0.1 to 0.5 mol per mol of polyvinyl alcohol or allyl alcohol-modified polyvinyl alcohol. When more than that is added, the resin will become water-insoluble and the object of the present invention can hardly be attained. On the other hand, when the amount is less than 0.1 mol, the number of the reactive double bonds to be introduced will become so small that the thermosetting property is poor.

The present invention includes also the case of co-acetalizing polyvinyl alcohol or allyl alcohol-modified polyvinyl alcohol with said unsaturated aldehyde and one or more saturated adehydes. The saturated aldehyde used in the present invention is acetaldehyde, propionaldehyde, n-butylaldehyde, iso-butylaldehyde or benzaldehyde and is added simuultaneously with or separately from the unsaturated aldehyde in the acetalizing reaction. The amount of addition of the saturated aldehyde is 0 to 0.1 mol per mol of polyvinyl alcohol or allyl alcohol-modified polyvinyl alcohol. Not only can the water-solubility be increased but also the property of the produced film can be improved in accordance with the nature of the aldehyde used and the clearness of the finished color and the hand of the printed product can also be improved.

The binder resin of the present invention wherein polyvinyl alcohol is partially acetalized with such unsaturated aldehyde as acrolein and reactive double bonds are introduced into the side chain will be cross-linked when heated and fast printed products can be thereby obtained. The aqueous solution of said resin has a proper stiffness, is excellent in ability to hold pigments, gives clear colors, is excellent fastness against abrasion and in water-proofness and solvent-proofness in both wet and dry conditions in setting and has other excellent properties.

When the reaction is further advanced in the acidic state, the double bonds in the side chain will be partially polymerized to constitute a three-dimensional net. If printing is carried out with such a polymer, the setting condition will be easier and products with sufficient fastness can be obtained with only intermediate drying.

As this acetalized resin can be used as an aqueous solution, the pigment resin printing paste of the present invention can be used not only as an aqueous printing paste but also as an oil-in-water emulsion printing paste prepared by emulsifying said resin with a water-insoluble high boiling point organic solvent which is a petroleum hydrocarbon preferably containing a small amount of aromatic compound and which has no mutual action with said resin. Such organic solvent may be mineral terpene or Dispersol.

However, though the partially three-dimensioned resin has a residual hydroxyl radical, it is low in water-solubility. When a thickener is added to said resin in case the resin is to be applied to an aqueous printing paste in which no oil is used, said resin may deposit a gel by partial dehydration and may make the printing difficult. In such case, if a resin acetalized with said saturated aldehyde is used, such defects will be eliminated. That is to say, if the resin is acetalized with a small amount of benzaldehyde which has no water-solubility at all, a polymer which can be easily diluted with water will be obtained. By the saturated aldehyde thus used, not only water-solubility can be increased but also softness can be given to the resin film produced on the fabric and the clearness of the finished color and the hand of the printed product can be improved.

Various coloring materials can be used in the pigment resin printing paste of the present invention. However, in case some kind of commercial phthalocyanine paste, such as Indanthrene Blue-RS or Threne Red Violet-RH is used, the color may not be so good as those of other coloring materials.

In such case, if an acid is added to the printing paste, some degree of improvement will be seen. It has been found that, when an aqueous solution of the acid salt of a polymeric acid amide made from polyacrylic acid ester and diamine or polyamine is added to said acetalized binder resin, better results will be obtained and that there can be obtained a printing paste which, even when said pigment paste is used, will give a printed product as clear in color and as good in fastness as in the case of other pigment pastes.

The acid salt of the polymeric acid amide used in the present invention is of a polymeric acid amide obtained by reacting a diamine or polyamine such as ethylene diamine, diethylene triamine or triethylene tetramine with a low alkyl ester such as the ethyl or butyl of polyacrylic acid. It can be made to exist in the form of a salt in an aqueous solution by an organic acid such as, for example, acetic acid or tartaric acid and can be made into a printing paste together with the binder resin. In such case, mineral acid can be also used but will be likely to damage the cloth to be printed. It is therefore more desirable to use an organic acid.

Further, in case a naphthol dyestuff is used together with the pigment resin printing paste of the present invention, in the conventional treating method, fabrics are printed, dried, colored with a naphthol base, and then finished by being treated in a 0.4% caustic soda bath at 80° C. In such case, the acidic and water-soluble polymeric acid amide will become insoluble in the alkaline bath, will be deposited and will not only serve to set the pigment but also hold the pigment before the binder resin is well set. It therefore has also an advantage of shortening the treating time.

In the Variamine Blue resisting treatment, tartaric acid or citric acid is added as a resist to the printing paste. In the case of such printing paste, the state of the paste is much better and the printing operation can be carried out more favorably than in the case of the acetalized binder resin alone. Thus, with the present printing paste, excellent improvements and favorable results can be attained in the simultaneous use of a naphthol dyestuff and in the resisting treatment.

The binder resin of the pigment resin printing paste of the present invention is as described above. A vinyl polymer latex may be further added thereto as required to improve the durability with respect to washing and the hand of the printed product. Such vinyl polymer latex is an emulsion of a polymerization or co-polymerization product of vinyl acetate, acrylic acid and metaacrylic acid ester, acrylonitrile, styrene, vinylidene chloride or butadiene. Further, a polyethylene emulsion can be also advantageously used for the same purpose.

The pigment resin printing paste of the present invention can also be used with the addition of another thermosetting resin. This is not usually added but may be added in case a printed product of a different hand is specifically required or in case a different effect is to be obtained by reducing the composition of the acetalized binder resin. Such thermosetting resin is water-soluble and is a formaldehyde condensation product or its derivative of urea, melamine, modified urea or modified melamine or a ketone resin.

The present invention shall be explained by means of the following examples which, needless to say, should not be interpreted to limit the present invention except as defined in the claims.

*Example 1*

When 2,000 parts by weight of a 6% aqueous solution of polyvinyl alcohol were acetalized by the addition of 30 parts by weight of acrolein and hydrochloric acid (35%) with agitation at 30° C. for 4 hours and were neutralized to be of a pH of 6 to 7 with a calculated amount of soda ash, an aqueous solution of a viscous resin was obtained.

20 parts by weight of said aqueous solution of the acetal resin, 10 parts by weight of Tyrose TWA (7%) and 5 parts by weight of a pigment paste were made 100 parts by weight with the addition of water while being uniformly agitated. When a piece of cloth was padded with this paste, was wrung in a mangle, was then dried at 110° C. on a cylinder and was heat-treated at 130° C. for 5 minutes, a fast printed product was obtained. This treatment was used specifically to dye rayon or cotton cloth.

*Example 2*

When 1,700 parts by weight of a 6% aqueous solution of polyvinyl alcohol were reacted by the addition of 24.5 parts by weight of acrolein and 20 parts of hydrochloric acid with agitation at 40° C. for 8 hours, the acetalized product was partially cross-linked to be an aqueous gel. When this aqueous gel was neutralized with a calculated amount of an alkali while being agitated by means of a high speed mixer, a very viscous sol was obtained.

The thermoplastic resin to be simultaneously used was prepared by polymerizing a mixture of 70 parts by weight of vinylidene chloride and 30 parts by weight of butyl acrylate in an emulsion state at a concentration of 40% by using sodium hydrosulfite and potassium persulfate as catalysts while thoroughly agitating at 30° C. for 15 hours. The thus obtained latex was so stable as not to be deposited with the addition of an acid.

An oil-in-water emulsion printing paste was prepared as follows:

| | Parts by weight |
|---|---|
| Acetal resin | 20 |
| Petroleum hydrocarbon (boiling at about 200° C.) | 40 |
| The above mentioned polymer latex | 20 |
| 12% red pigment paste | 10 |

The acetal resin was emulsified with the petroleum hydrocarbon solvent. A color paste prepared by kneading the polymer latex and the pigment paste together was added to the emulsion. When the mixture was uniformly emulsified with the addition of water or an aqueous solution of an aqueous thickener so that the printing paste might be 100 parts by weight, an oil-in-water emulsion printing paste was obtained. When a fabric, machine-printed by using this printing paste, was dried and finished, a printed product favorable in water-proofness, abrasion-proofness and solvent-proofness was obtained. The temperature and time for the after-treatment were usually 120° C. and 3 minutes, respectively. However, the after-treatment was not always necessary.

*Example 3*

2,000 parts by weight of a 10% aqueous solution of polyvinyl alcohol were acetalized with the addition of 50 parts by weight of acrolein in the presence of a catalyst consisting of sulfuric acid at 30° C. for 1.5 hours. When the product was neutralized with a calculated amount of soda ash, the desired aqueous solution of the acetal resin was obtained.

|  | Parts by weight |
|---|---|
| Acetal resin | 20 |
| Copolymer latex (30%) of butyl acrylate and methyl meta-acrylate | 20 |
| Petroleum hydrocarbon (boiling at about 200° C.) | 50 |
| 30% paste of copper phthalocyanine pigment | 10 |

When the above composition was thoroughly agitated as in Example 2, a hard-toned printing paste for screen printing was obtained. A heat-treatment at 120° C. for 5 minutes was good enough.

*Example 4*

An aqueous solution of methylol methyl ethyl ketone prepared by methylolizing a mixed solution of methyl ethyl ketone and formalin with the addition of potassium sodium carbonate as a catalyst at a pH of 8 for 3 hours was used as a binder.

|  | Parts by weight |
|---|---|
| Acetal resin of Example 1 | 70 |
| The above mentioned ketone resin | 10 |
| Petroleum hydrocarbon (boiling at about 200° C.) | 130 |

A mixture of the above mentioned composition was uniformly emulsified by means of a homogenizing mixer. 80 parts of a copolymer latex (40%) of butadiene and acrylonitrile and 10 parts of a Lake Golden Yellow pigment paste (20%) were added to the emulsion and the mixture was agitated. By adding a 5% aqueous solution of polyacrylamide as an aqueous thickener and water, 400 parts of a viscous oil-in-water emulsion paste were obtained. When this printing paste was used specifically in the simultaneous use of another resin, it gave a soft hand. The finishing was effected as usual. The drying treatment was carried out at 140° C. for 4 minutes.

*Example 5*

200 parts by weight of a 5% aqueous solution of polyvinyl alcohol were acetalized with the addition of 2 parts by weight of croton aldehyde and 5 parts by weight of hydrochloric acid at 70° C. for 1.5 hours, were cooled and were then neutralized at room temperature.

|  | Parts by weight |
|---|---|
| The above mentioned acetal resin | 30 |
| Vinyl polymer latex of Example 2 | 15 |
| Tyrose paste (7%) | 30 |
| Pigment paste | 10 |

A mixed solution of the above mentioned composition was made a total of 100 parts by weight with the addition of water or an aqueous solution of an aqueous thickener to obtain an aqueous printing paste. A fabric printed in the usual method by using this printing paste, pre-dried and finished was as good as that which was treated with the oil-in-water emulsion of Example 2. Even when it was later passed through an alkali and an acid or was treated with steam, it did not discolor. Especially, it could be well set by steaming and alkali treatment.

*Example 6*

When vinyl acetate and allyl acetate in ⅛ mol per mol thereof were copolymerized in methanol as a solvent and the copolymer was alkali-hydrolyzed, an allyl alcohol-modified polyvinyl alcohol was obtained. 2,000 parts by weight of a 6% aqueous solution of said product were acetalized with the addition of 30 parts by weight of acrolein as in Example 1. The printing paste prepared by using it was very fluid and had the excellent properties of an aqueous paste using no oil.

The printing paste was prepared as follows:

|  | Parts by weight |
|---|---|
| The above mentioned acetal resin | 30 |
| Vinyl latex of Example 2 | 15 |
| Tyrose paste (7%) | 30 |
| Pigment paste | 10 |

A mixture of the above mentioned composition was made a total of 100 parts by weight with the addition of water to obtain an aqueous printing paste. A fabric, printed using this mixture, was dried and finished.

*Example 7*

2,500 parts by weight of a 6% aqueous solution of polyvinyl alcohol were reacted with the addition of 30 parts of acrolein and 4 parts of n-butylaldehyde in the presence of 25 parts of hydrochloric acid as a catalyst with agitation at 30° C. for 4 hours. The product was a viscous aqueous solution. It was neutralized with soda ash and was thoroughly agitated to be uniform. When 250 parts of methanol were added thereto, an aqueous solution of a setting agent was obtained. A cotton product could be printed using the following prescription:

|  | Parts by weight |
|---|---|
| The above mentioned acetal resin | 30 |
| Tyrose paste ($^{65}/_{1000}$) | 30 |
| Phthalocyanine green (30% paste) | 10 |
| Emulsified polymer of butyl acrylate (40%) | 15 |

By adding water or a thickener to the above composition, 100 parts of a paste adjusted to proper viscosity were obtained. In machine-printing, when the cotton product, printed by using this paste, was dried and finished, a water-proof and abrasion-proof printed product was obtained. A heat-treatment carried out at 120° C. for 3 minutes was sufficient to improve the water-proofness. However, a heat-treatment was not always necessary.

*Example 8*

In the case of obtaining a beautiful printed product of a clear color tone, the aqueous solution of polyvinyl alcohol mentioned in the above Example 8 was reacted with the addition of 30 parts of acrolein and 2 parts of benzaldehyde at 30° C. for 4.5 hours.

In printing by using an aqueous solution of such polymer, the following composition was made 100 parts with the addition of water to obtain a printing paste:

|  | Parts by weight |
|---|---|
| The above mentioned acetal resin | 40 |
| Tyrose paste ($^{65}/_{1000}$) | 30 |
| Aqueous pigment paste | 10 |

When the fabric, printed upon with an ordinary method using this paste, was dried and finished, a clear fast printed product was obtained.

*Example 9*

A co-acetalized product consisting of 2,500 parts of a 6% aqueous solution of polyvinyl alcohol, 5 parts of acetaldehyde and 25 parts of acrolein was prepared as in Example 7.

|  | Parts by weight |
|---|---|
| The above mentioned acetal resin | 30 |
| Copolymer latex of acrylonitrile (20):butyl acrylate (80) | 15 |
| Tyrose paste ($^{65}/_{1000}$) | 30 |
| Coloring paste containing 20 parts by weight of a red pigment | 15 |
| Water | 10 |
| Total | 100 |

When a fabric was printed upon with the above mentioned printing paste and was after-treated at 120° C. for 3 minutes, favorable results were obtained. The printing ability of the paste prepared by this method was especially favorable.

*Example 10*

When 1,000 parts by weight of a 5% aqueous solution of polyvinyl alcohol were acetalized by the addition of 15.9 parts by weight of acrolein and 12 parts by weight of 35% hydrochloric acid at 30° C. for 3 hours, an aqueous solution of a high viscosity was obtained. By neutralizing it with an alkali in equal amount, a paste of an aqueous solution of a setting agent resin was obtained. This was the binder resin.

A resin to be simultaneously used was prepared as follows: 500 parts of butyl acrylate, 500 parts of butanol and 5 parts of benzoyl peroxide were mixed together and were heated and polymerized at 80° C. for 8 hours by replacing air with nitrogen gas in the reaction vessel. 450 parts of diethylene triamine were further added to the polymer. The mixture was heated with agitation at 100 to 105° C. for 18 to 21 hours so that butyl polyacrylate might be made a partial acid amide. The polymer acide produced was soluble in an aqueous solution of acetic acid. The butanol was driven out by concentration under a reduced pressure. The polymeric amide was dissolved with the addition of 700 parts of acetic acid. By adding 2,300 parts of water thereto, an aqueous solution of the acetate was obtained.

The printing paste was prepared as follows:

| | Parts by weight |
|---|---|
| Polyvinyl alcohol acetal | 70 |
| Polymeric acid amide | 10 |
| Aliphatic petroleum boiling near 200° C. (Mineral terpene or Dispersol.) | 130 |

When the above composition was uniformly mixed by means of a homogenizing mixer, an oil-in-water emulsion was obtained. When 80 parts by weight of a copolymer latex (40%) consisting of butadiene and acrylonitrile and 40 parts by weight of a pigment paste were mixed with the emulsion and, as required, a polyacryl amide thickener were added to the mixture, 400 parts of a viscous printing paste were obtained.

In the case of printing by using a pigment paste inferior in dispersibility such as some kind of commercial phthalocyanine blue pigment, the finish according to this prescription was clear and showed an excellent effect.

*Example 11*

200 parts of a 25% butanol solution of ethyl acrylate were reacted with the addition of 2 parts of azo-bis-iso-butylonitrile at a reflux temperature for 6 hours. 29 parts of ethylenediamine were added to this ethyl polyacrylate solution and were reacted at 98 to 100° C. for 19 to 20 hours. After the butanol was driven out, the reaction product was made an acetate with 56 parts of acetic acid. The acetate was dissolved in 270 parts of water. When this solution was simultaneously used with the resin of Example 10, a printing paste such as in Example 10 was obtained.

*Example 12*

400 parts of a 10% aqueous solution of polyvinyl alcohol were acetalized by the addition of 272 parts of water, 8 parts of hydrochloric acid (35%) and 11.4 parts of acrolein with agitation at 30° C. for 3 hours. By neutralizing this paste, an aqueous solution of an acetalized resin was obtained.

The resin to be simultaneously used was prepared as follows: 50 parts of butyl acrylate ester, 100 parts of butanol and 0.5 part of benzoyl peroxide were mixed together. After air was replaced with nitrogen gas in the reaction vessel, when the mixture was heated and reacted at 80° C. for 10 hours, polybutylacrylate was obtained. 50 parts of diethylene triamine were further added thereto. The mixture was heated and reacted at 115 to 117° C. for 10 to 11 hours. After the butanol was removed by distillation, a paste (25%) was obtained by precipitating, water-washing and then filtering the reaction product. The paste was dissolved with the addition of 20 parts of acetic acid. When the solution was then uniformly emulsified with the addition of 200 parts of petroleum hydrocarbon, a polymeric acid amide emulsion was obtained. The printing prescription was as follows:

| | Parts by weight |
|---|---|
| Polyvinyl alcohol acetal | 10 |
| Polymeric acid amide emulsion | 10 |
| Copolymer latex of vinylidene chloride and butyl acrylate | 20 |
| Red FB paste (15%) | 10 |
| Polyacrylamide oil-in-water emulsion | 40 |

100 parts of a printing paste were obtained by adding water to the above composition.

The polyacrylamide thickener was prepared by adding an oil such as mineral terpene to a 5% aqueous solution of polyacrylamide prepared by polymerizing acrylamide in an aqueous solution and then emulsifying the mixed solution by means of a homogenizing mixer.

*Example 13*

The setting by an alkaline bath by using the pigment resin printing paste of the present invention was carried out as follows: A fabric, printed upon by using the printing paste of Example 11, was dried on a cylinder at 105 to 110° C. for 40 seconds, was then treated in an alkaline bath of 10 cc. of 40 Bé. caustic soda per liter at 82 to 83° C. for 1 minute, was then washed with water and was dried and finished. The printing concentration, color tone and fastness were the same as in the case of dry heat-treatment. In this method, the product could be finished by alkali-treatment without carrying out dry heat-treatment.

*Example 14*

An example of the Variamine Blue resisting treatment will next be explained with reference to the use of the binder resin paste of Example 12.

20 parts of a polymer amide emulsion and 10 parts of tartaric acid were thoroughly agitated. 10 parts of Red ITR pigment paste and 20 parts of a copolymer latex of butyl acrylate and methyl metaacrylate were added thereto. 10 parts of a binder resin and 25 parts of an oil-in-water emulsion of an aqueous solution of polyacrylamide by a petroleum hydrocarbon solvent were further added thereto. By adding water and an aqueous thickener to the mixture, 100 parts of viscous printing paste were obtained. A piece of cloth, printed upon with Naphthol AS by using this printing paste, was intermediately dried, was then padded in a color developing solution by Variamine Blue Salt NSV, was aired, was then passed through a solution of 5 g. of zinc sulfate per liter and was washed with water. This cloth was further treated in a 0.4% caustic soda bath around 80° C. for 1 minute, was washed with water and was dried and finished. Resisting was perfect and a clear color tone was obtained. All pigments can thus be subjected to resisting treatment. The color of the finished product was deeper, clearer and faster than in the case of the binder resin alone.

What is claimed is:

1. A product comprising an aqueous printing paste which contains a pigment and as a binder composition an aqueous solution of a polyvinyl compound selected from the group consisting of polyvinyl alcohol and copolymers of vinyl alcohol with a minor proportion of allyl alcohol, said compound having 0.1 to 0.5 mol equivalent of acrolein per monomer unit combined in acetal form.

2. A product comprising an aqueous printing paste which contains a pigment and as a binder composition an aqueous solution of a polyvinyl compound selected from the group consisting of polyvinyl alcohol and copolymers of vinyl alcohol with a minor proportion of allyl alcohol, said compound having 0.1 to 0.5 mol equivalent of acrolein and at least 0.1 mol equivalent of an aldehyde selected from the group consisting of acetaldehyde, n-butylaldehyde and benzaldehyde, per monomer unit combined in acetal form.

3. A product comprising an aqueous printing paste which contains a pigment and as a binder composition an aqueous solution of a polyvinyl compound and acetic acid salt of a high molecular acid amide, said compound being selected from the group consisting of polyvinyl alcohol and copolymers of vinyl alcohol with a minor proportion of allyl alcohol and having 0.1 to 0.5 mol equivalent of acrolein per monomer unit combined in acetal form, said high molecular acid amide being the reaction compound of a polyalkyl acrylate selected from the group consisting of polyethyl acrylate and polybutyl acrylate, with a polyamine selected from the group consisting of ethylenediamine and diethylenetriamine.

4. A product comprising an aqueous printing paste which contains a pigment and as a binder composition an aqueous solution of a polyvinyl compound and acetic acid salt of a high molecular acid amide, said compound being selected from the group consisting of polyvinyl alchol and copolymers of vinyl alcohol with a minor proportion of allyl alcohol and having 0.1 to 0.5 mol equivalent of acrolein and at least 0.1 mol equivalent of an aldehyde selected from the group consisting of acetaldehyde, n-butylaldehyde and benzaldehyde, per monomer unit combined in acetal form, said high molecular acid amide being the reaction compound of a polyalkyl acrylate selected from the group consisting of polyethyl acrylate and polybutyl acrylate, with a polyamine selected from the group consisting of ethylenediamine and diethylenetriamine.

5. A printing paste according to the claim 1 which contains a coloring material, a thickner and water, besides the binder composition.

6. A printing paste according to the claim 2 which contains a coloring material, a thickner and water, besides the binder composition.

7. A printing paste according to the claim 3 which contains a coloring material, a thickner and water, besides the binder composition.

8. A printing paste according to the claim 4 which contains a coloring material, a thickner and water, besides the binder composition.

9. A printing paste according to claim 1, which contains a coloring material, polyacrylamide and water, besides the binder composition.

10. A printing paste according to claim 1, which contains a coloring material, a thickener, water, a latex made of a polymer selected from the group consisting of the copolymer of vinylidene chloride with butyl acrylate and copolymer of butadiene with acrylonitrile, besides the binder composition.

References Cited in the file of this patent

UNITED STATES PATENTS

| | | |
|---|---|---|
| 2,441,470 | Carswell | May 11, 1948 |
| 2,733,229 | Brace | Jan. 31, 1956 |
| 2,780,562 | Reinartz | Feb. 5, 1957 |

FOREIGN PATENTS

| | | |
|---|---|---|
| 479,548 | Great Britain | Feb. 8, 1938 |
| 577,866 | Great Britain | July 1946 |
| 469,525 | Canada | Nov. 21, 1950 |

OTHER REFERENCES

Schildknecht: "Vinyl and Related Polymers," published by John Wiley & Sons, New York, 1952, page 360.